(12) United States Patent
Akyamac et al.

(10) Patent No.: US 8,842,984 B2
(45) Date of Patent: Sep. 23, 2014

(54) METHODS OF PROTECTION SHARING FOR MULTI-PROTECTED OPTICAL DEMANDS IN LARGE-SCALE WDM MESH NETWORKS

(75) Inventors: Ahmet A. Akyamac, Bridgewater, NJ (US); Gary W. Atkinson, Freehold, NJ (US); Ramesh Nagarajan, Princeton Junction, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1588 days.

(21) Appl. No.: 12/169,204

(22) Filed: Jul. 8, 2008

(65) Prior Publication Data

US 2009/0263124 A1 Oct. 22, 2009

Related U.S. Application Data

(60) Provisional application No. 61/046,238, filed on Apr. 18, 2008.

(51) Int. Cl.
- *H04B 10/08* (2006.01)
- *H04J 14/02* (2006.01)
- *H04L 12/24* (2006.01)
- *H04L 12/707* (2013.01)

(52) U.S. Cl.
CPC .............. *H04J 14/0284* (2013.01); *H04J 45/28* (2013.01); *H04L 41/0663* (2013.01); *H04J 14/0295* (2013.01); *H04L 45/22* (2013.01)
USPC ............................................. 398/17; 370/225

(58) Field of Classification Search
USPC .......... 370/216, 217, 225, 227, 228; 709/226, 709/228, 229; 398/1, 5, 7
See application file for complete search history.

(56) References Cited

U.S. PATENT DOCUMENTS

| | | | |
|---|---|---|---|
| 6,392,989 B1 * | 5/2002 | Jardetzky et al. | 370/216 |
| 6,744,727 B2 * | 6/2004 | Liu et al. | 370/228 |
| 7,113,481 B2 * | 9/2006 | Elie-Dit-Cosaque et al. | 370/238 |
| 7,218,851 B1 * | 5/2007 | Zang | 398/33 |
| 7,460,783 B2 * | 12/2008 | Fumagalli et al. | 398/5 |
| 2009/0003211 A1 * | 1/2009 | Akyamac et al. | 370/235 |

OTHER PUBLICATIONS

Baworntummarat C et al: "On the comparison of optical WDM mesh network protection strategies" MILCOM 2000.21st Century Military Communications Conference Proceedin gs Oct. 22-25, 2000, Piscataway, N J, USA, IEEE, vol. 2, Oct. 22, 2000.*
W.D. Grover, M. Clouqueur, "Span-Restorable Mesh Network Design to Support Multiple Quality of Protection (QoP) Service-Classes," *Proceedings of ICOCN 2002*, Singapore.
G. Austin, B. Doshi, C. Hunt, R. Nagarajan, M. Qureshi, "Fast, scalable, and distributed restoration in general mesh optical networks," *Bell Labs Technical Journal*, vol. 6:1, Aug. 2002.
T. Chow, F. Chudak, A. Ffrench, "Fast Optical Layer Mesh Protection Using Pre-Cross-Connected Trails," *IEEE/ACM Transactions on Networking*, 12 (Jun. 3, 2004), p. 539.

(Continued)

*Primary Examiner* — Donald Mills
*Assistant Examiner* — Henry Baron
(74) *Attorney, Agent, or Firm* — Wall & Tong LLP

(57) ABSTRACT

A method and system for identifying and, optionally, managing protection resource sharing opportunities, such as within a large-scale wavelength-division multiplexing (WDM) mesh network.

35 Claims, 6 Drawing Sheets

(56) References Cited

OTHER PUBLICATIONS

International Search Report in PCT/US2009/002377, dated Jul. 15, 2009, Alcatel-Lucent USA Inc., Applicant, 13 pages.

Baworntummarat C et al: "On the comparison of optical WDM mesh network protection strategies" MILCOM 2000. 21st Century Military Communications Conference Proceedings Oct. 22-25, 2000, Piscataway, NJ, USA, IEEE, vol. 2, Oct. 22, 2000, pp. 886-891, XP010532032 ISBN: 978-0/7803-6521-6.

Maher Ali: "Generalized Sharing in Survivable Optical Networks" IEEE/ACM Transactions on Networking, IEEE/ACM, New York, NY, US, vol. 14, No. 6, Dec. 1, 2006, pp. 1388-1399, XP011145279 ISSN: 1063-6692 p. 1388-p. 1390.

Sarah Ruepp et al: "Nodal Stub-Release in All-Optical Networks" IEEE Communications Letters, IEEE Service Center, Piscataway, NJ, US, vol. 12, No. 1, Jan. 1, 2008, pp. 47-49, XP011200193 issn: 1089-7798 p. 47, left-hand column, line F—right-hand column, line 34.

\* cited by examiner

US 8,842,984 B2

METHODS OF PROTECTION SHARING FOR MULTI-PROTECTED OPTICAL DEMANDS IN LARGE-SCALE WDM MESH NETWORKS

CROSS REFERENCE TO RELATED APPLICATIONS

This application claims benefit of U.S. provisional patent application Ser. No. 61/046,238, filed Apr. 18, 2008, which is herein incorporated by reference.

BACKGROUND OF THE INVENTION

1. Field of the Invention

The present invention relates to communications networks and, more specifically, to determining protection resource sharing opportunities such as within a large-scale wavelength-division multiplexing (WDM) mesh network.

2. Description of the Related Art

Optical transport networks today are increasingly being designed, deployed, and provisioned as mesh networks with shared path protection. Typical mesh network designs include path protection based on the assumption of a single node or link failure in the network. This is a reasonable assumption for high-availability nodes, given the low probability of link cuts or failures. However, such design assumptions do may not adequately allow for the possibility where failures are not independent random events, such as catastrophe scenarios or planned and coordinated attacks which might involve multiple failures occurring in a compressed timeframe. As such, there is a need by defense and civil agencies for robust high-speed backbone landline networks resilient to multiple failures. However, one of the major challenges of designing a multi-service network robust to multiple failures is providing the needed redundancy in a capacity- or cost-efficient manner. Thus, capacity sharing is desirable within the context of network design and provisioning so that the resource necessary to support a demand flow (i.e., demand) of a path remains satisfied in the event of link or node failures. Of particular interest is capacity sharing within a large scale wavelength-division multiplexing (WDM) mesh network.

One approach to shared protection is finding, for each optical resource demand flow, two node-disjoint lightpaths between source and destination nodes (i.e., one for the primary path and one for the backup or protection path). Such disjoint paths offer the advantage of not requiring fault isolation and thus tend to provide faster restoration compared to alternative approaches. When planning and/or provisioning capacity for protection against single node or link failures using node-disjoint paths, two demands can share protection capacity if the primary paths of the two demands are node disjoint and the underlying graph topology allows link intersection of the backup paths. This design is based on the assumption that, after one such failure anywhere in the network occurs, the remaining resource demands are not expected to have protection and therefore forfeit their guarantee to restoration from a single failure (i.e., the remaining resource demands are "demoted" from 1-protected to unprotected). Otherwise, if each resource demand must be restorable after one failure that only directly effects it, the restoration bandwidth must be dedicated. Since the primary paths are disjoint, no single failure will simultaneously effect both demands, and since no protection for the second demand is required after any one failure in the network, then the two demands can share protection bandwidth.

Another approach to shared protection is where the bandwidth of a failed primary path is made available for restoration of other demands. This is referred to as primary reuse or stub release; specifically, the releasing of capacity of the primary path of a demand effected by a failure for reuse by other demands for restoration. One drawback to primary reuse is that such reuse may preclude reversion (i.e., restoration of the failed demand to the original primary path once repairs to it are completed). However, due to the complexity in the control plane of implementing reversion, networks using shared meshed path protection either allow or preclude primary reuse, but typically does not implement reversion.

SUMMARY OF THE INVENTION

Various deficiencies associated with the prior art are addressed by the present invention of a method and system for identifying and, optionally, managing protection resource sharing opportunities, such as within a large-scale wavelength-division multiplexing (WDM) mesh network employing multi-protected optical resource demands. In one embodiment a method for distributing protection capacity within a mesh network includes the steps of identifying primary and protection capacity associated with each of a plurality of protected light paths within the mesh network; determining, for each possible k-element failure, a corresponding protection capacity for recovering from the k-element failure; determining protection capacity sharing opportunities according to each of a plurality of protection sharing mechanisms; and adapting protection capacity allocations in response to the determined protection sharing opportunities.

Other embodiments include a method and system for determining a required backup capacity within a mesh network using k-level protection and backup capacity sharing. In one embodiment, a method for distributing protection capacity is implemented by determining, for each protected light path of a mesh network, a backup path capacity for each of a plurality of failed paths and assigning one or more links of failed paths to other light paths. Data indicative of an overall backup capacity is then stored for use by, illustratively, a protection management mechanism.

BRIEF DESCRIPTION OF THE DRAWINGS

Various embodiments can be readily understood by considering the following detailed description in conjunction with the accompanying drawings, in which.

To facilitate understanding, identical reference numerals have been used, where possible, to designate identical elements that are common to the figures.

Other aspects, features, and advantages of various embodiments will become more fully apparent from the following detailed description, the appended claims, and the accompanying drawings in which:

DETAILED DESCRIPTION

Various embodiments provide management methods adapted to improve the resiliency of a communications network, such as a large-scale wavelength division multiplexing (WDM) mesh network, by sharing protection capacity within the network. Specifically, various embodiments distribute and/or reallocate protection capacity within such a network to provide enhanced overall performance of the network, improved recovery from a link or node failure and improved customer satisfaction with network performance.

Various embodiments employ one or more sharing methods which separately or in combination provide for efficient protection-capacity sharing based on, illustratively, a path protection paradigm in an optical transport network. The methodologies of the various embodiments may be employed within the context of a network design tool, an online (or offline) provisioning system or, more generally, a management mechanism benefiting from a determination of available protection capacity sharing opportunities. In a provisioning system, the sharing results are passed on to the network management and control system for, e.g., the order of the backup paths used when multiple backup paths are available.

In one embodiment, a method for distributing protection capacity is implemented by determining, for each protected light path of a mesh network, a backup path capacity for each of a plurality of failed paths, assigning one or more links of failed paths to other light paths, and storing data indicative of an overall backup capacity for use by a protection management mechanism.

Figure 1:
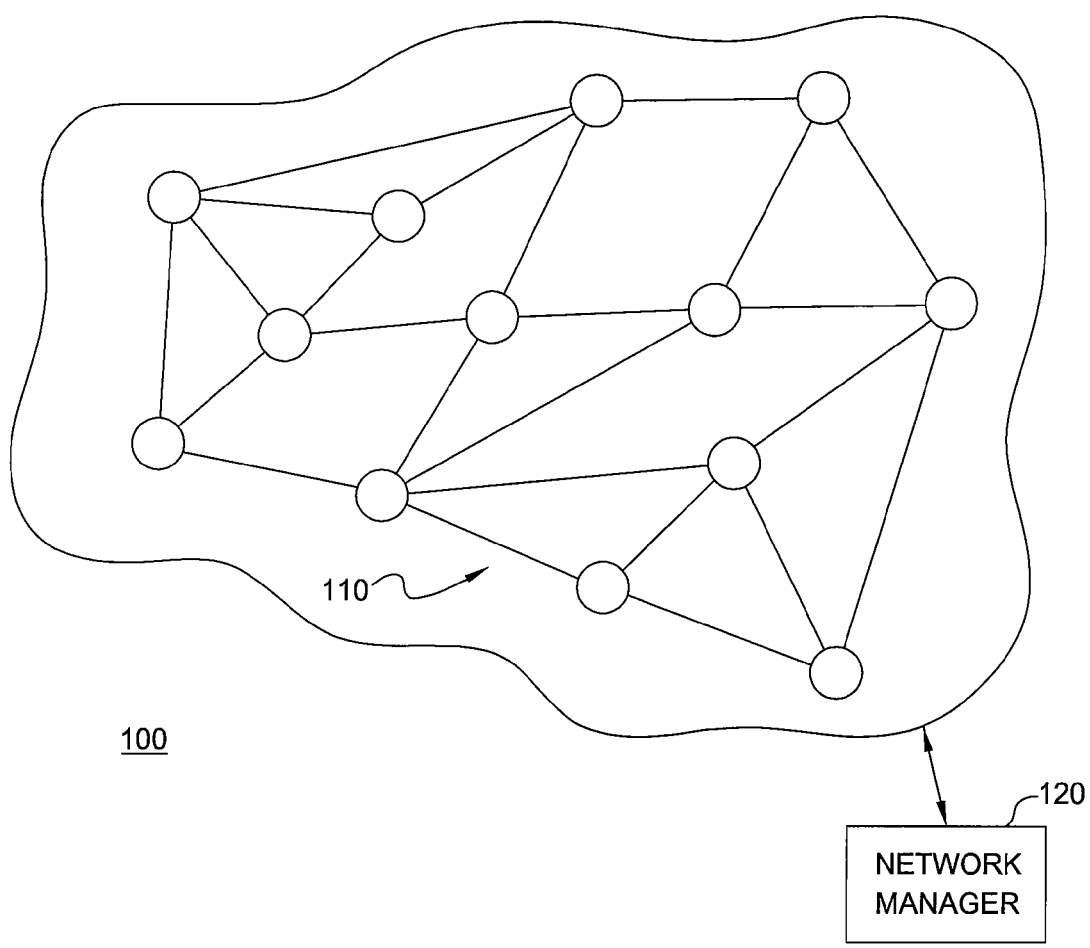
FIG. 1 depicts a high-level block diagram of a mesh network according to various embodiments described herein.

FIG. 1 depicts a high-level block diagram of a mesh network according to various embodiments described herein. Specifically, the mesh network 100 of FIG. 1 includes a plurality of interconnected nodes 110 and a network manager 120. It will be appreciated by those skilled in the art that the network 100 depicted in FIG. 1 is only exemplary. Various embodiments may include different network topologies and/or networks with different numbers of nodes. The network may be a multi-layer network and/or multi-service networks Each of the nodes 110 is connected to (linked to) some number of other nodes. In particular, the number of inter-node links to any particular node should be large enough to support k-protected demands, where "k" is a preselected integer. That is, if a node is included in a path that needs to withstand a single link failure (k=1), then the node must have links to two additional nodes (i.e., links to two destination nodes as well as the link from a source node). If a node is included in a path that needs to withstand two link failures (k=2), then the node must have links to three additional nodes (i.e., links to three destination nodes as well as the link from a source node).

The network manager 120 is depicted as managing the entire network 100 from a remote location. However, it will be appreciated by those skilled in the art that the network manager 120 may be operatively coupled to one or more nodes. Moreover, multiple network managers may be distributed throughout the network to produce a cooperative distributive network manager.

The network manager 120 comprises a computing system having, illustratively, an input/output (I/O) interface, a data processor and a memory. Methodologies according to embodiments of the invention can be performed by instructions from software that is stored in computer-executable form in the memory and/or executed by the processor.

The various embodiments may also be implemented as a computer program product wherein computer-executable instructions, when processed by a computer, adapt the operation of the computer such that the methods described herein are performed. Instructions for invoking the methods may be stored in fixed or removable digital data storage media stored within a working memory within a digital computing device.

Herein, management methods are adapted for use within various types of mesh networks optical (e.g., WDM) transport networks. The networks may support multiple service types to users, e.g., various QoS categories. Each service has its own protection class. Herein, a service type that is designed to tolerate k failures of service will be referred to as being k-protected. The failures may be node failures and/or link failures. The mesh network may provide k-protected services between its nodes, wherein the value of k varies from node to node. The various embodiments provide methods for designing protection schemes that offer a preselected protection level for each service.

Services are contained or provided by transport layer wavelength circuits (end-to-end lightpaths) between service end nodes. Each wavelength circuit is either dedicated to providing wavelength services between the source and destination nodes or contains sub-wavelength traffic that is aggregated together. In the former case, a wavelength service will occupy the entirety of the wavelength, so the protection class of the wavelength circuit is that of the associated wavelength service. In the latter case, the wavelength circuits are transporting sub-wavelength traffic between aggregation and/or terminating devices. When sub-wavelength traffic is aggregated into a wavelength circuit, the subrate traffic can be in either the same protection class or be a heterogeneous mix of protection classes. In either case, the protection class of the wavelength circuit is assigned to be that of the highest subrate protection class in the circuit. The wavelength circuit requirement in a protection class between two nodes constitutes a demand. The set of all demands in a protection class constitutes a protection tier.

All traffic in a protection tier is protected against the appropriate number of optical transport failures. This protection is provided, in various embodiments, in the optical transport layer through the use of end-to-end wavelength circuits that are path-protected via node-disjoint paths. The term node-disjointness refers to the intermediate nodes and not necessarily the terminating nodes of the wavelength circuits. This embodiment provides fast, multi-failure protection for k-protected demands between nodes of degree k or more. In terms of all the possible protection paradigms (path protection, local detours, etc.), a sufficient condition that a k-protected demand be restorable is that there exist in the network topology k+1 node-disjoint paths between the terminating nodes. Any k-protected service is assumed to be k-protectable, i.e., that there exists the requisite number of node-disjoint paths between end nodes.

In one embodiment of the invention, bandwidth requirements are determined by first planning (or accessing the plan for) a multi-protection topology and then determining a capacity reduction by seeking sharing opportunities in the required protection capacity.

Thus, given a set of primary and protection paths for each demand, the protection capacity required can be determined by identifying what capacity can be shared when considering all possible failure scenarios for the demands and their protection levels. The invention makes that determination based on applying various selectable methods of protection capacity sharing.

Figure 2:
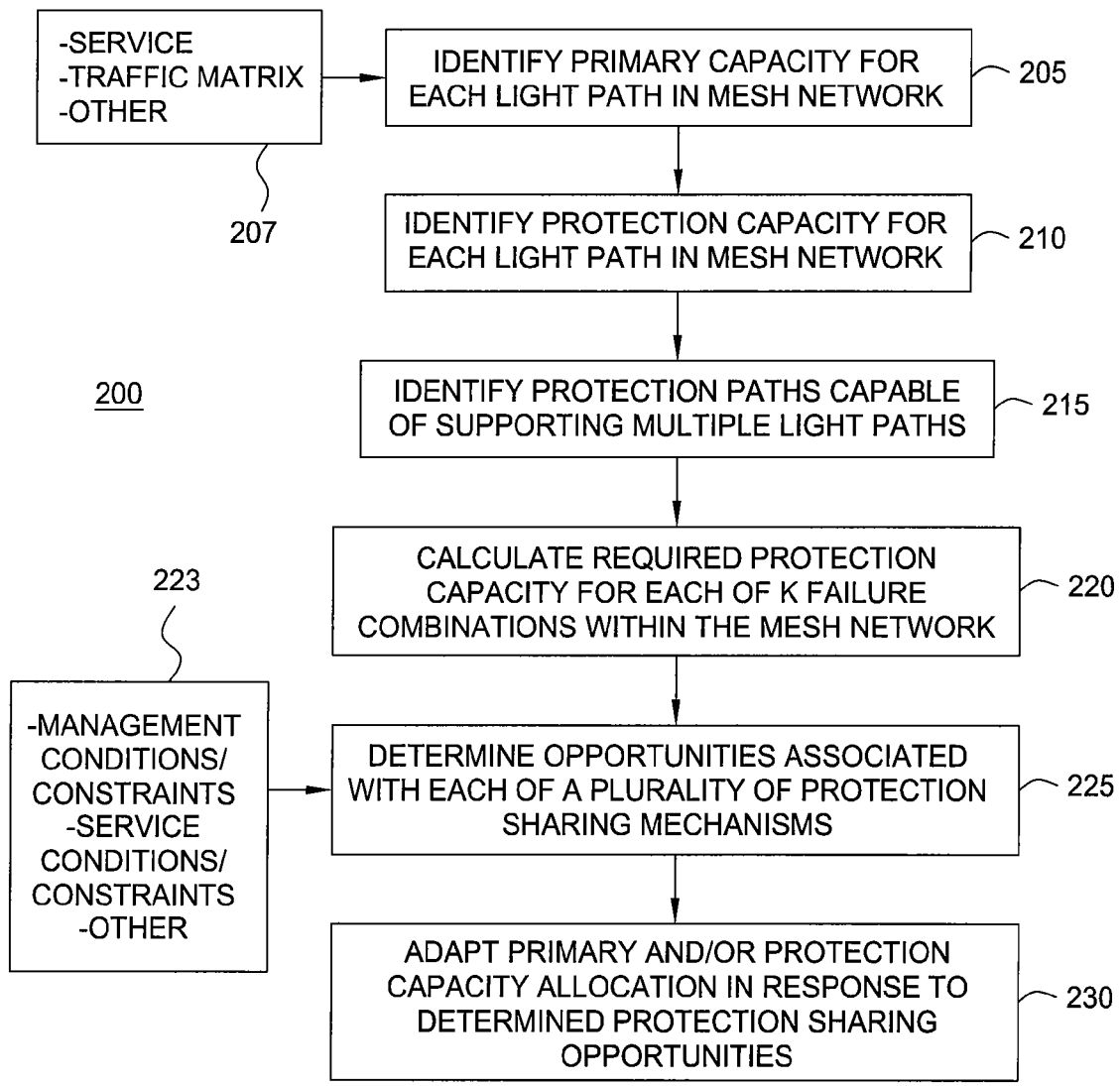
FIG. 2 depicts a flow diagram of a method according to one embodiment.

FIG. 2 depicts a flow diagram of a method according to one embodiment. The method 200 of FIG. 2 is a high level representation of methods further discussed in FIGS. 3-5.

Specifically, the method 200 of FIG. 2 is entered at step 205, where the primary capacity for each light path in a mesh network is identified. This identification uses, per box 207, service connectivity, traffic matrix information or other information available to network design or management systems.

At step 210, the protection capacity for each light path in the mesh network is identified. At optional step 215, the protection paths supporting multiple light paths are identified. At step 220, the protection capacity associated with each of a plurality of k-failure combinations within the mesh network is calculated. That is, assuming k=3 each of a plurality of failure combinations involving three elements or links is identified, as discussed in more detail below. Optionally, all of the possible k-failure combinations are identified. Steps 205-220 operate to determine the total protection capacity (without sharing) necessary to enable continued operation of all light paths or demands for any of the k failure combinations.

At step 225, opportunities associated with each of a plurality of protection sharing mechanisms is determined. This determination is made with respect to, per box 223, network management conditions and/or constraints or other conditions such as customer requirements, service requirements and the like. As noted below, there are a number of protection sharing mechanisms that may be employed. Selection of the particular mechanisms is driven by processing limitations, management conditions/constraints (e.g., topology, management system, network element/link homogeneity or heterogeneity and so on), service conditions/constraints (e.g., tiered service, guaranteed service levels and so on) as well as other factors.

At step 230, the allocation of primary and/or protection capacity of the network is adapted in response to the opportunities identified at step 225. In various embodiments, an iterative process is invoked to determine for each failure scenario a plurality of possible sharing opportunities such that a "best" provisioning of the network may be realized by adapting the primary and protection capacity allocations within the network. This provisioning is influenced by a number of factors as will be described herein.

To enable protection capacity sharing, it is desirable to meet the following two conditions: (1) a topological requirement wherein it is possible to have node-disjoint paths for primary and backup wavelength circuits for the relevant demands; and (2) the intersection of at least some of the backup/protection paths. Two demands with topologically suitable paths can share if the same protection bandwidth is not required given all possible failure scenarios for one or more working paths of each of the two demands. Failure scenario disjointness can occur when paths of two demands are topologically disjoint. When backup paths are not disjoint, protection sharing is enabled by protection tier demotion; namely, the protection class of a demand (defined by the number of failures network-wide the transporting wavelength circuit must be able to withstand whether or not they directly affect the demand's working path) is reduced once for each failure. Including failures across the network in a failure count creates failures that are disjoint for demands with intersecting backup paths, thus enabling protection capacity sharing. Thus, a k-protected wavelength circuit must be protected against any combination of k transport node and link failures in the network.

Mechanisms for Protection Capacity Sharing

The methodologies of the present embodiments utilize one or more of several protection sharing mechanisms such that the use of a primary and/or secondary protection path for a demand flow (e.g., a specific WDM lightpath supporting a path) is adapted in a manner improving overall network performance. Each of these protection capacity sharing mechanisms provides for the sharing of protection resources in a particular manner.

Various embodiments determine the protection capacity required by the network by identifying the protection capacity that can be shared (and protection capacity that cannot be shared) when considering all possible failure scenarios for the demands (demand flows) and their protection levels. In this manner, a network operator may choose to apply various protection capacity sharing mechanism, either separately or in combination, to provide multi-failure protection in multi-service networks using node-disjoint path protection.

One embodiment defines a network in terms of a tier structure. For example, one tier structure divides nodes according to the amount of guaranteed bandwidth (GB) traffic terminated by a node. In this embodiment, a first tier comprises nodes terminating a relatively heavy amount of GB traffic, a second tier comprises nodes terminating an intermediate amount of GB traffic, a third tier comprises nodes terminating a relatively low amount of GB traffic and so on. Other tier structures are contemplated by the inventors, including tiers based on relative traffic class or priority, such as guaranteed bandwidth (GB) traffic, Internet protocol (IP) point-to-point demand flows, wavelength service (WS) such as multi-wavelength service point-to-point demand flows, best effort to sub-rate IP point-to-point demand flows and the like. In general, tiers are defined in terms of priority levels, traffic type and so on.

The protection sharing mechanisms may include nominal sharing, protection release, stratified sharing, non-stratified sharing, working reuse and/or fail over order (FOO). One or more of the protection sharing mechanisms may be selected for inclusion within protection sharing methods according to the various embodiments. The selection is made according to customer, management and/or service criteria. These protection sharing mechanisms are defined as follows:

(1) Nominal sharing—Sharing protection capacity due to protection class demotion within a defined protection tier, wherein a failure only effects a demand in that tier (intra-tier demotion). That is, in response to the failure of a resource supporting a particular demand flow, only protection capacity supporting demand flows in the same protection class are impacted (e.g., protection path decrementing/demotion for the other demands in the same protection class).

(2) Protection Release or Protection Requirement Release is the releasing of unused protection capacity in one tier for the use or allocation to demands associated with one or more higher protection tiers. Protection release is implemented after the occurrence of a network wide failure that results in protection losses resulting in insufficient protection for the higher tier (inter-tier demotion). That is, in response to the failure of a resource supporting a demand flow in a higher protection class, protection capacity supporting demand flows in a lower protection class are impacted (e.g., protection path decrementing/demotion for the other demands in the lower protection class). In this manner, the protection capacity for higher protection classes or tiers is maintained as long as possible.

(3) Stratification or Stratified sharing is protection capacity sharing restricted to single protection tiers (i.e., no inter-tier sharing of protection capacity). Stratified sharing comprises the dedication of protection capacity to individual tiers. Nominal sharing may be implemented using either a stratified sharing paradigm or a non-stratified sharing paradigm.

(4) Non-stratified sharing is protection capacity sharing between multiple protection tiers (i.e., inter-tier sharing of protection capacity). In a non-stratified scheme, nominal sharing involves the protection capacity sharing that occurs in the stratified case as well as any cross-tier sharing that may occur. It is noted that protection release can be employed only in a non-stratified sharing scheme.

(5) Working reuse is where the bandwidth of a failed working path for one demand is made available for the restoration of other demands. That is, the protection capacity of a current working path (original primary or any activated backup path) is released for reuse by other demands for restoration of protection capacity. Working reuse can be applied in either a stratified or non-stratified protection sharing scheme, and in either single- or multi-tier cases. There are two special cases of working reuse; namely primary reuse (where a failed working path is the original primary path), and backup reuse (where a failed working path is a backup path currently being used by a demand effected by a failure). Backup reuse applies only to k-protected demands with k>1. Backup reuse does not preclude immediate reversion since only the non-primary bandwidth is released for reuse.

(6) Failover Order (FOO)—For a multi-protected demand, this is the order in which multiple backups are activated to restore the demand as each failure occurs. The failover order can be static or dynamic. In the static case, the FOO is pre-assigned and pre-fixed for all failure scenarios. In the dynamic case, the FOO can be modified from an original (static) ordering during operation of the network.

The above protection sharing mechanisms contemplate changes in protection levels such as demotion to a lower protection level. As noted above, two types of demotion shall be considered herein; namely, intra-tier demotion and inter-tier demotion. When multiple protection tiers are present, capacity sharing based on stratification will optionally be considered.

Working reuse is optionally considered where a demand effected by a failure is available for reuse by other demands for restoration. One consideration for applying working reuse is whether or not reversion is to be employed. Demand reversion is restoring a service operating on (one of) its backup path(s) to (one of) its working path(s) before the failure once repairs to that working path are completed. Network reversion is when all effected demands have been reverted. As can be seen, there may be degrees of network reversion in a multi-protected environment since there may be more than one working path that certain demands can revert to, or not all demands on backup paths revert. One special case is complete network reversion, namely, network reversion back to the original primary path of each protected demand.

When considering complete network reversion, there are two special cases of working reuse. When an effected working path is the original primary path, we call this primary reuse (stub release). Primary reuse may preclude reversion (immediately upon repair completion, that is; however, the network could be reverted if the restored demands utilizing primary bandwidth are in turn reverted to their original primaries, i.e., the restored state of the network must be "unwound" to its pre-failure state). Backup reuse is the release of capacity of any (original) backup path that is the current working path of a demand effected by a failure for reuse by other demands for restoration. Backup reuse applies only to k-protected demands with k>1. Backup reuse does not preclude immediate reversion since only the non-primary bandwidth is released for reuse.

In multi-failure protection, an additional consideration is the order in which the multiple backups are activated. For a multi-protected demand, failover order (FOO) is the order in which the (unaffected) backups are used to restore the demand when multiple failures occur. The failover order can be static or dynamic. In the static case, the FOO is pre-assigned and fixed for all failure scenarios. In the dynamic case, the FOO can be modified from the original (static) ordering in a particular failure scenario.

For the most part, these sharing strategies can be composed in various ways to create an overall capacity sharing scheme. The specific protection sharing mechanisms and strategies that are combined will depend on operator preference, management requirements, service requirements and/or performance objectives for the intended network.

Considerations for Application of the Various Mechanisms

For the most part, these sharing strategies can be composed in various ways to create an overall capacity sharing scheme. Which strategies are combined into the scheme will depend on operator preferences and performance objectives for the intended network. For example, static FOO would likely lead to faster restoration times than dynamic due to simplified operations and protocols in the static case since there is no need to determine whether a backup path is available or best. However, dynamic FOO generally could be more capacity efficient than static FOO since in the worst case a dynamic ordering could default to an optimal static one.

The rationale behind reversion is that the prior working paths (say, the original primary paths) may be preferred, e.g., possibly due to better delay characteristics, or that they may represent a "base" state of the network from which new growth is planned and understood. In that case only backup reuse should be employed. However, there can be complications implementing a revertive scheme, such as control plane complexities due to reversion synchronization, for example. When reversion is not applied, full working reuse can be utilized to improve sharing capacity efficiency.

Another consideration is whether to employ a scheme that is stratified or non-stratified. A non-stratified scheme will generally offer greater capacity efficiency if for no other reason than being less constrained in sharing opportunities. However, stratified schemes have the potential of operational simplicity compared to non-stratified ones. For example, one operational approach to a stratified scheme after paths and sharing capacity are determined would be to overlay each tier on top of the lower tiers. In effect, each tier is its own protection sub-network within its own dedicated bandwidth. The operational simplicity arises from protocols and controls devoted to one tier versus ones that must accommodate all tiers. The reduced operational complexity of a stratified scheme may offset the costs for its increased capacity requirements.

Implementation of One Embodiment of the Invention

The foregoing ideas and sharing methods are implemented in a system to identify sharing opportunities based on those ideas and reduce capacity requirements given a network topology, a set of demands in protection classes, and their primary and backup paths. This implementation can be employed offline as either part of a network planning and design system or as part of a network provisioning framework, or online as part of an online provisioning system.

The following description is for the example embodiment for k=3 protection classes and all possible failure scenarios up to three failures that involve at most one node failure. Also, static failover ordering is assumed.

Figure 3A:
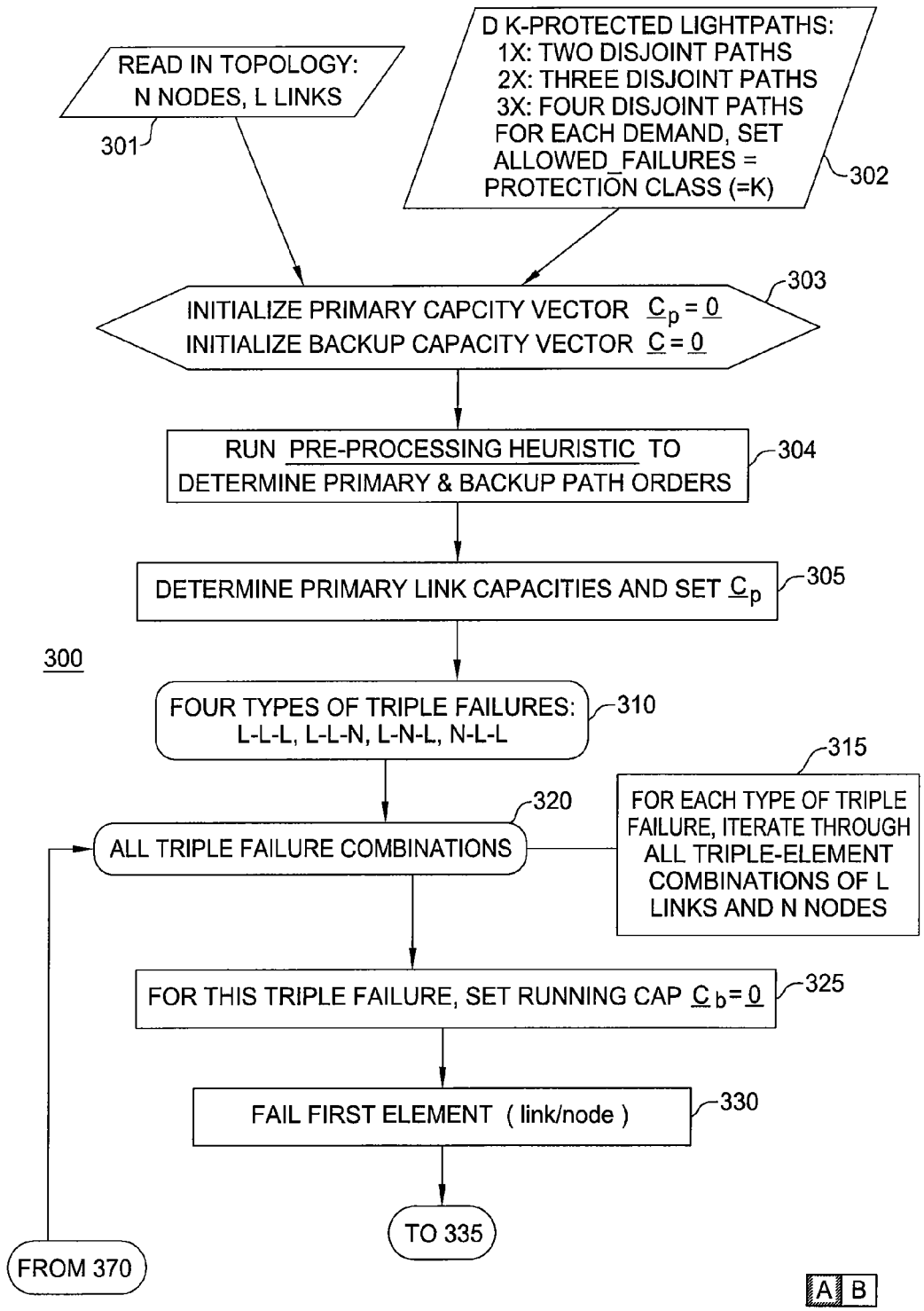
FIG. 3 depicts a flow diagram of a capacity sharing determination method according to an embodiment.
Figure 3B:
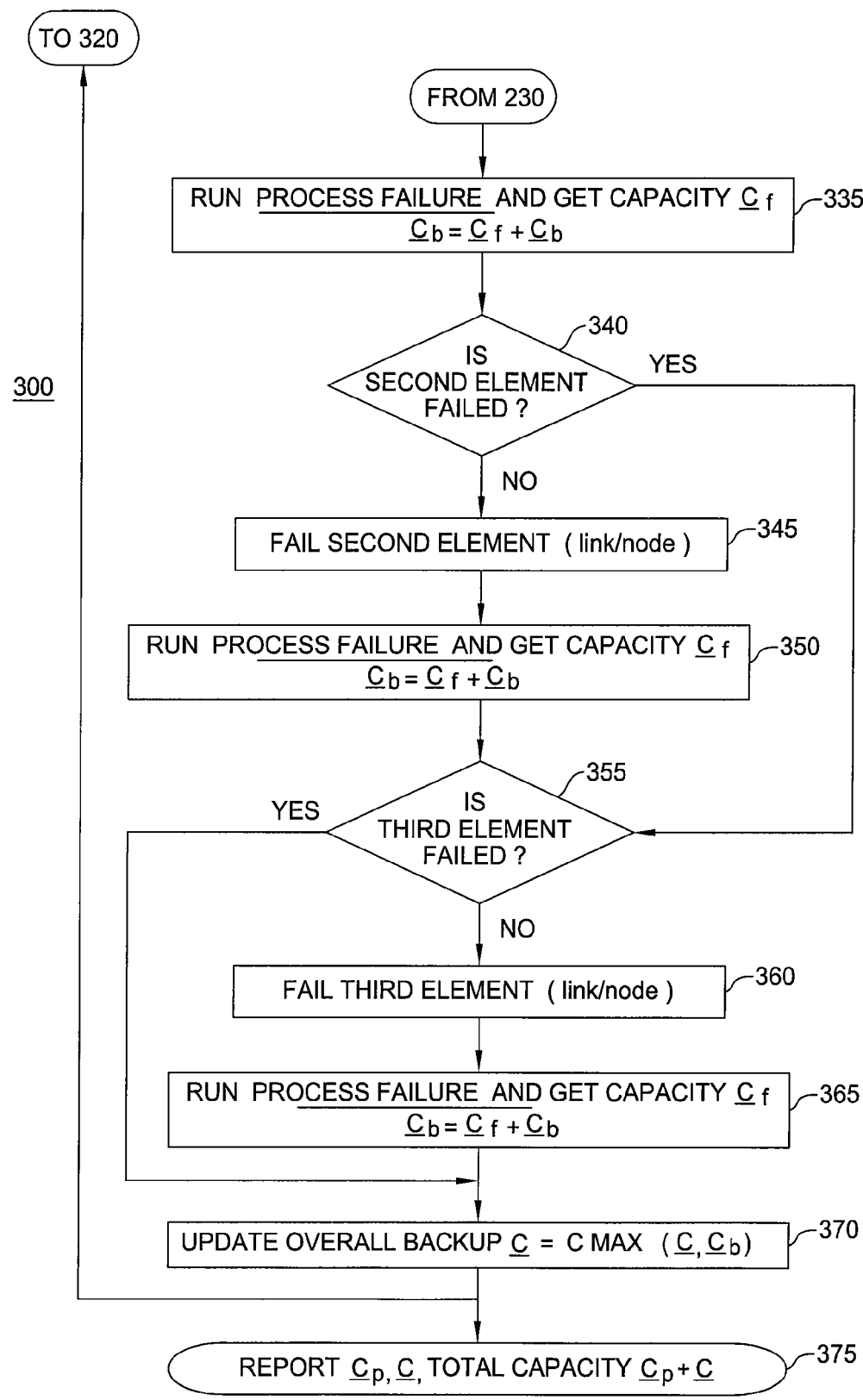

FIG. 3 depicts a flow diagram of a capacity sharing determination method according to an embodiment of the present invention depicting protection up to 3 levels for link and node failure scenarios where at most one node fails. The capacity sharing determination method 300 of FIG. 3 is depicted as comprising a preparation for iterations methodology 300-A and an iterative determination methodology 300-B.

The preparation for iterations methodology 300-A utilizes two types of input information. The first input information 301 specifies the network topology in the form of nodes and links. The second input information 302 specifies the paths (in terms of node hops) for the D lightpath demands. There are three types of lightpath demands: k-protected demands have (k+1) disjoint paths for k=1, 2, and 3. Each lightpath is assumed to have a bandwidth of one wavelength or λ. In addition, for each demand, a variable allowed_failures is set equal to the protection class k (e.g., 1, 2, 3 etc.).

Upon receiving the topology information at step 301 and the path information at step 302, an initialization of primary and backup link capacity vectors is performed at step 303.

At optional step 304, a pre-processing heuristic is invoked to determine primary and backup path orders. An exemplary pre-processing heuristic will be described in more detail below with respect to FIG. 3. It should be noted that the order of steps 303 and 304 may be reversed. The pre-processing heuristic is used to determine a path failover order for the lightpath demands (i.e., the order in which the paths associated with the lightpath are attempted as multiple failures occur in the network). At the end of the heuristic execution, each lightpath will have associated with it an assigned primary path and ordered backup paths.

If the pre-processing heuristic is not invoked (i.e., step 304 is skipped), then the failover order of the paths defaults to that order provided via the input information. In one embodiment, the input backup order is related to path length and, therefore, the shortest path is considered to be the primary path. Other variations will be known to those skilled in the art.

Once the backup order is established, then at step 305 the primary link capacities $C_p$ are determined from the primary paths, where $C_p$ is a vector whose components are primary capacity in wavelengths of each link in the network. In the following, capacities are represented by vectors whose entries correspond to network links. All operations discussed herein which are performed on the various vectors comprise vector operations.

The backup link capacities C are iteratively determined using the iterative determination methodology 300-B (i.e., steps 310-375). Specifically, as noted at step 310, four types of ordered triple failures are considered; link-link-link (L-L-L), link-link-node (L-L-N), link-node-link (L-N-L) and node-link-link (N-L-L). As indicated in steps 315-320, for each type of failure, all possible failure scenarios are processed iteratively. For example, for the L-L-L case, all combinations of three sequential link failures are considered. For each iteration (failure combination), an independent backup capacity $C_b$ is calculated. Since the triple failure scenarios are independent of each other, at the end of each iteration the overall capacity C is updated by taking the component-wise max of C with $C_b$, that is, set $C_i$=max$\{C_i, C_{bi}\}$.

At the beginning of each iteration, the running capacity is initialized at step 325 to $C_b$=0. Each iteration involves sequentially failing (illustratively) three elements. The inherent assumption is that the processing of one failure is completed prior to the occurrence of the next failure such that race conditions need not be considered.

At step 330, the first element is failed and the required capacity to recover from this failure, $C_f$, is calculated at step 335 using a Process_Failure routine. An exemplary process failure routine will be discussed more detail below with respect to FIG. 5. The running capacity is then updated using $C_b$=$C_b$+$C_f$.

At step 340, a determination is made as to whether or not the second failure should be considered. Specifically, the same element will not be failed again. Additionally, the failure of the second element will not be considered if that element is already in a failed state. For example, if the first element failure corresponded to a node, all incident links would already be in a failed state. If the second element has been failed previously or is in a failed state, and the method when a proceeds to step 355. If the second element is not already in a failed state, then it is failed at step 345 and the method 300 proceeds to step 350, where the required capacity to recover from this failure, $C_f$, is calculated using the Process_Failure routine and the running capacity is updated using $C_b$=$C_b$+$C_f$.

At step 355, a determination is made as to whether or not the third failure should be considered (see second failure considerations above). If the third element has been failed previously or is in a failed state, then the method when a proceeds to step 370. If the third element is not already in a failed state, then it is failed at step 360 and the method 300 proceeds to step 365, where the required capacity to recover from this failure, $C_f$, is calculated using the Process_Failure routine and the running capacity is updated using $C_b$=$C_b$+$C_f$.

After the three failures are processed, then at step 370, the overall backup capacities are updated by taking the component-wise max of C with $C_b$, C=cmax (C, $C_b$) (i.e., set $C_i$=max$\{C_i, C_{bi}\}$), where $C_b$ represents the backup capacity required for the processed triple failure scenario. It is noted that the triple failure scenarios are independent of each other. The method 300 then proceeds to step 320 to begin processing the next triple failure. However, if all four ordered triple failure scenarios have been iterated through steps 320-370, then at step 375 the method 300 reports (i.e., stores in memory, returns as a quantity or solution to a provisioning system, etc.) the overall required backup capacity C, the primary capacity $C_p$, and the total necessary capacity $C_p$+C. This is in addition to the availability of the failover order for the demands' paths, constituting a complete provisioning for the demand set.

Figure 4:
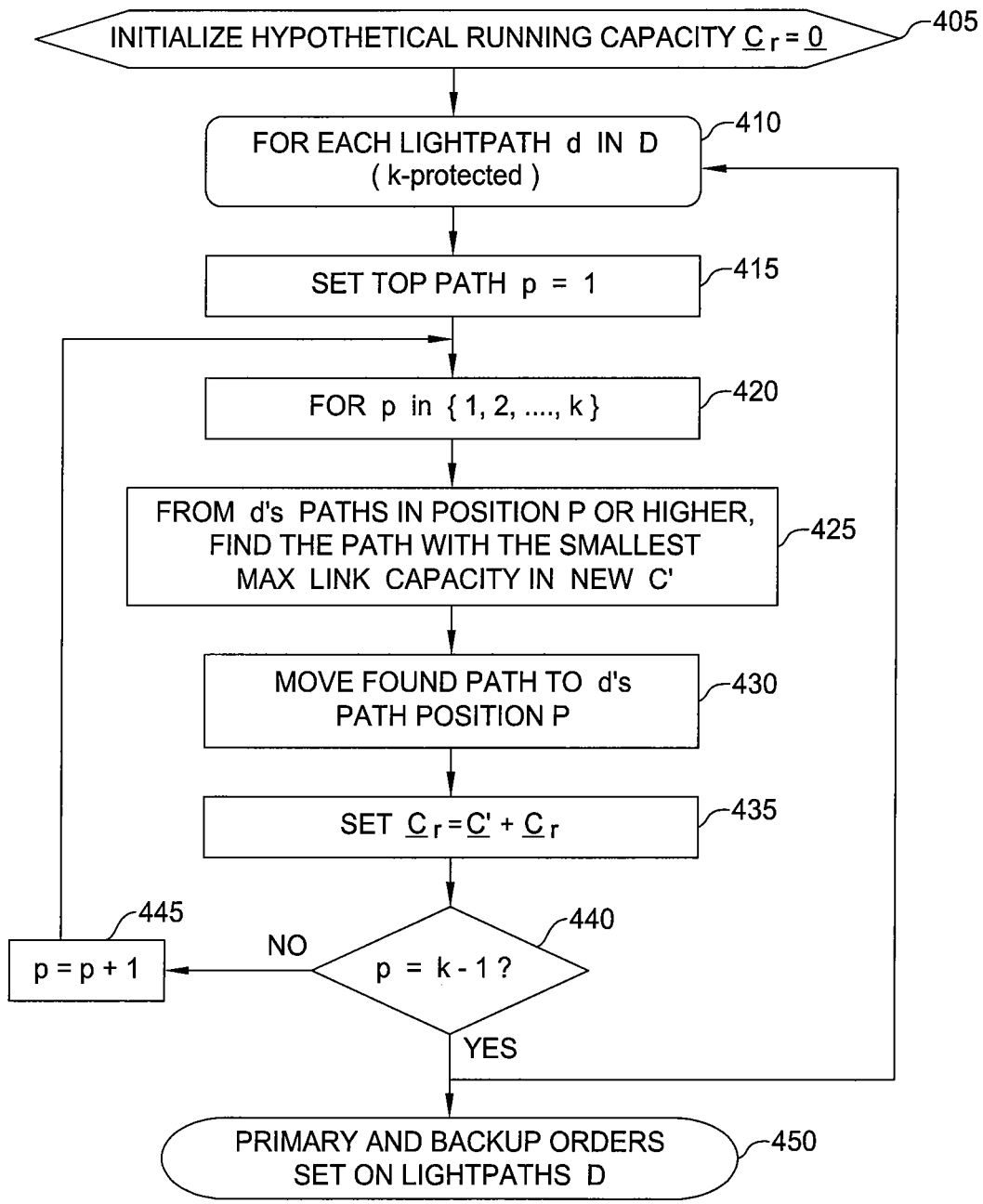
FIG. 4 depicts a flow diagram of a preprocessing method suitable for use in the capacity sharing determination method of FIG. 3.

FIG. 4 depicts a flow diagram of a preprocessing method suitable for use in the capacity sharing determination method of FIG. 3. Specifically, FIG. 3 depicts a preprocessing method or heuristic suitable for use in implementing step 304 of the method 300 of FIG. 3.

The pre-processing heuristic 400 of FIG. 4 determines the primary and backup path orders for lightpaths. It does so by looking at each lightpath and adding all of its defined paths to the network with hypothetical capacities. The lightpaths that create the smaller maximum link capacity in the network are added earlier, and this heuristic determines their order.

At step 405, a running capacity is initialized for a hypothetical network as $C_r$=0.

At step 410, a first or next liked path d is selected for processing, where d ∈ D that is k-protected, and there are k+1 paths defined. That is, for each lightpath d ∈ D that is k-protected, there are k+1 paths defined. The heuristic 400 checks each of these k+1 paths (via a top path variable p initially set equal to 1 at step 415) by individually adding them to the network and creating a hypothetical updated capacity C' (steps 420-435).

For each set of updated link capacities (step '20), the maximum link capacity max $\{C'\}$≡max$_i\{C'_i\}$ is determined (step 425). Specifically, the path which generates the smallest max $\{C'\}$ is designated to be the primary path, the next smallest is designated to be the first backup path and so on. If there is a tie, the tie-breaker is the lowest total capacity sum $\{C'\}$≡$\Sigma_i C'_i$. If two paths generate the same max$\{C'\}$, the path that generates the smaller sum $\{C'\}$ is ordered ahead of the other. This procedure orders all k+1 paths for the lightpath d, and C' now contains the added capacities of all of the k+1 paths of d. Once the primary and backup path orders for lightpath d are determined, the running capacity for the hypothetical network is updated (step 435) using $C_r$=$C_r$+C' and the heuristic moves on to the next lightpath (steps 440, 445).

Thus, steps 420-435 are repeated for each of the lightpaths p until, at the end of the heuristic (step 450), all lightpaths have designated primary and backup path orders and $C_r$ is discarded.

Figure 5:
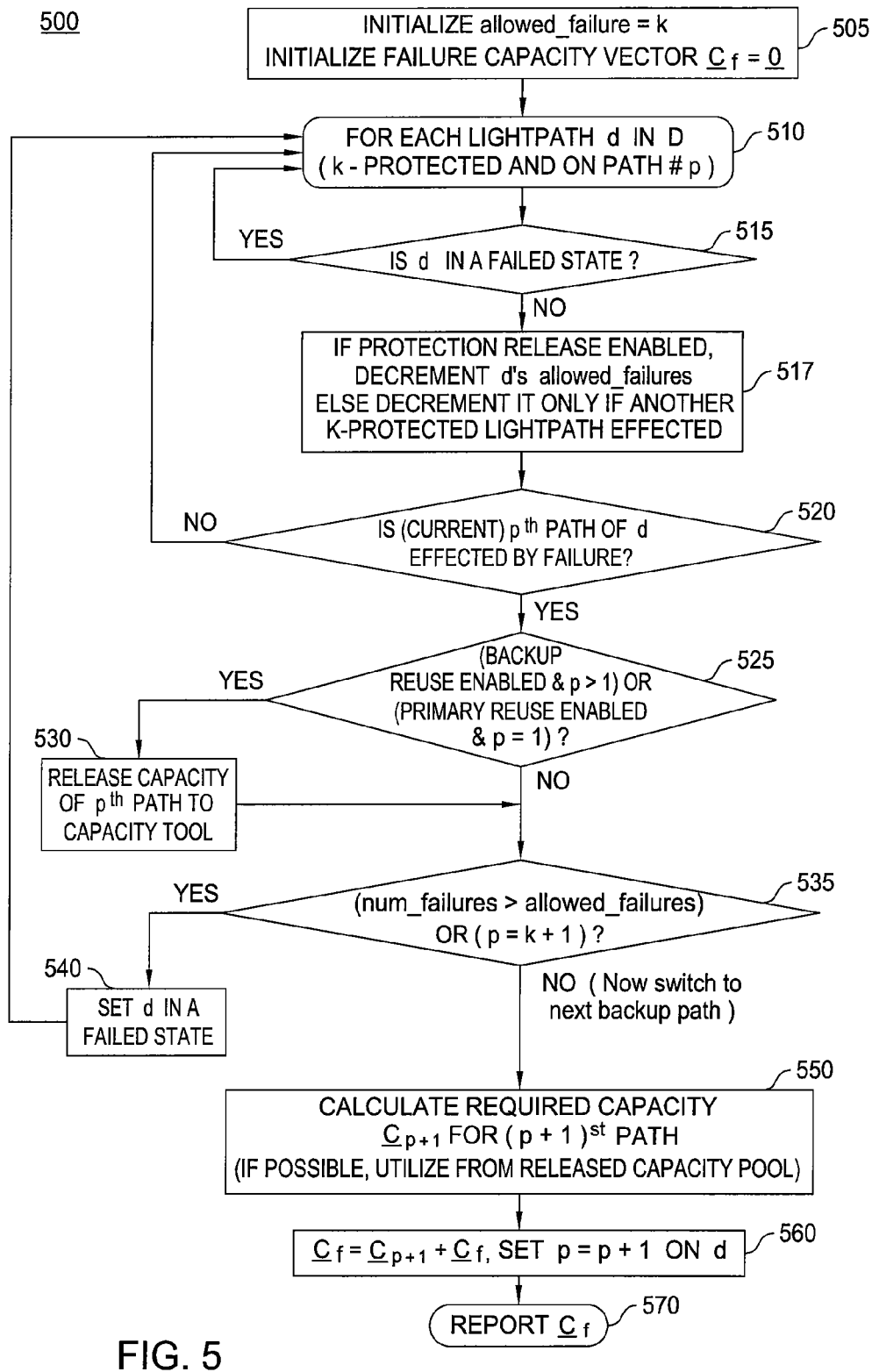
FIG. 5 depicts a flow diagram of a failure processing method suitable for use in the capacity sharing determination method of FIG. 3.

FIG. 5 depicts a flow diagram of a failure processing method suitable for use in the capacity sharing determination method of FIG. 3. Specifically, FIG. 5 depicts a process failure method or heuristic suitable for use in implementing steps 335, 350 and/or 365 of the method 300 of FIG. 3.

The Process_Failure function processes the failure of a given element by checking all lightpaths d in a set D, determining whether the lightpath is effected by the failure and, if so, changing the state of the lightpath and determining the required capacity. Note that even though the backup paths are pre-defined, the backup capacity is not considered to be used until a failure causes the lightpath to switch to a backup path.

At step 505, a capacity required to recover from the element's failure is initialized as $C_f=0$. The remaining iterative processing steps (steps 510-560) are then performed for each lightpath $d \in D$.

At step 510, a first or next lightpath d is selected and, at step 515, a determination is made as to whether the selected lightpath d is already in a failed state (e.g., from a previous element's failure). If the selected lightpath d is already in a failed state, then the method 500 returns to step 510 where the next lightpath d is selected for processing.

At step 517, if an optional protection release mechanism is enabled, then the allowed_failures counter for lightpath d, originally k since d is in protection class k, is decremented by one (i.e., any failure in the network demotes each working lightpath). If the protection release mechanism is not enabled, lightpath d's allowed_failures counter is decremented by one only if another k-protected lightpath is determined to be effected by this elements failure (i.e., only failures within the k-protected class demote k-protected lightpaths).

In an alternate embodiment, higher protection classes are given preferential treatment. Thus, the allowed_failures counter for a 1-protected lightpath will be decremented before that of a 2-protected lightpath, which itself will be decremented before that of a 3-protected lightpath and so on. This embodiment seeks to ensure that customers paying for highly protected lightpaths are more likely than other customers to recover from a failure.

In an alternate embodiment, lower protection classes are given preferential treatment. Thus, the allowed_failures counter for a 3-protected lightpath will be decremented before that of a 2-protected lightpath, which itself will be decremented before that of a 1-protected lightpath and so on. This embodiment seeks to ensure that all customers on average are likely to recover from a failure.

In an alternate embodiment, the allowed_failures counter for lightpath d is only decremented in the case of a network failure within the same tier. Specifically, in one embodiment of the invention each lightpath d is associated with a respective service tier. The service tier may be defined in terms of service type, geographic region, service provider and the like. This embodiment seeks to ensure that failures within a particular tier will primarily effect other customers within that tier. For example, failures associated with a particular service type and/or within a particular geographic region and/or with a particular service provider will likely be confined within that service type, geographic region and/or service provider.

At step 520, a determination is made as to whether the current path of d, its $p^{th}$, is effected by this element's failure. If there is no effect, the method 500 returns to step 510 where the next lightpath d is selected for processing (i.e., no action is taken for this lightpath). If d is effected by this failure, several cases are considered.

At step 525, if an optional backup reuse mechanism is enabled and lightpath d is not on its original primary path (p>1) or it is (p=1) but an optional primary reuse mechanism is enabled, then the capacity from the effected path is released to the capacity pool in step 530.

Thus, if d is failed or restored by switching to its backup path as a result of the element's failure, the capacity used prior to the failure is released to be used by the restoration of other lightpaths if a backup reuse or primary reuse option is selected. It should be noted that if a primary reuse is not chosen as an option, capacity cannot be released from a primary path since it is assumed that a future repair on the primary path will result in a reversion of lightpath d to its primary path. If a primary or backup reuse is chosen as an option, capacity is released from any path state, including primary paths. Thus, during the processing of any failure, there may be released capacity available to use for restoration. This released capacity will not incur any additional capacity requirements.

In an alternate embodiment, both primary and backup links are released in the event of a $k^{th}$ failure of a k-protected lightpath. In another embodiment, the primary link reservation if maintained for the failed to lightpath. In still another embodiment, the primary link reservation and one backup link reservation is maintained for the failed lightpath.

At step 535, a determination is made as to whether d has all of its backup paths or whether the number of network-wide failures have exceed the number failures d is entitled to be restored from. If either of these is the case, then d is not restorable and is placed in a failed state (step 540), and the method proceeds to step 510 where the next lightpath d is selected for processing. Otherwise, at step 550 d is restored by switching to its subsequent backup path. It is noted that the subsequent path is the next functioning backup path in the order specified by the FOO.

Also at step 550, when d is restored by switching to its subsequent backup path, the new capacity required, $C_{p+1}$, is calculated by first checking if any released capacity can be used, then by adding any necessary capacity on the links across the new backup path of d. Then in step 560, overall capacity required is then updated using $C_f=C_f+C_{p+1}$. If further lightpaths d in D are available for selection, then the method 500 proceeds to step 510 where the next lightpath d is selected for processing.

Once the processing of all lightpaths d in D is completed, in step 570 the overall capacity required to recover from the given element's failure, $C_f$, is reported (i.e., stored in memory, returned as a quantity or solution to a provisioning system, etc.)

The above-described invention has been presented within the context of triple failures. It will be appreciated by those skilled in the art and informed by the teachings of the present invention that more or fewer failure combinations may be processed in accordance with the inventive methodology to provide protection sharing for multi-protected optical demands.

An apparatus in accordance with one embodiment of the subject invention may comprise a computer operating as part of a network management system (NMS) or element management system (EMS). The apparatus may be associated with one particular network element or multiple elements. The functionality discussed herein may be fully provided by one instance of the apparatus or multiple instances thereof. Generally speaking, any computing device either within or without any of the nodes or network elements in the network may be employed to implement the methods described herein. Thus, in various embodiments, the processing methodologies employed herein are executed within the context of network or element management systems associated with a mesh network. Determinations made according to the various methodologies are stored within digital memory or digital data storage devices associated with a network or element manager. The various embodiments may be implemented via computer or other processing systems within a network element, network management system or element management system.

Although various embodiments that incorporate the teachings of the present invention have been shown and described in detail herein, those skilled in the art can readily devise many other varied embodiments that still incorporate these teachings.

What is claimed is:

1. A method for distributing protection capacity within a mesh network, comprising:
   determining, for at least one failure associated with at least one protected lightpath in the mesh network, a corresponding failed path;
   determining a backup path capacity for the failed path;
   assigning one or more links of the failed path to other lightpaths in the mesh network; and
   storing data indicative of the backup path capacity in a network management system associated with the mesh network;
      wherein each of said at least one protected lightpath is associated with an allowed number of failures determined to affect another lightpath.

2. The method of claim 1, wherein said assigning is performed in accordance with at least one protection sharing mechanism selected in accordance with a management constraint.

3. The method of claim 1, wherein said assigning is performed in accordance with at least one protection sharing mechanism selected in accordance with a service constraint.

4. The method of claim 1, further comprising:
   determining, for a set D of up to k-protected lightpaths, a primary link capacity $C_p$; and
   storing data indicative of the primary link capacity $C_p$.

5. The method of claim 4, further comprising:
   invoking a pre-processing heuristic to determine primary and backup path orders.

6. The method of claim 5, wherein the pre-processing heuristic operates to iteratively process each lightpath d within the set D of up to k-protected lightpaths to determine for each lightpath d a respective path p associated with a smallest maximum link capacity.

7. The method of claim 4, wherein a total backup link capacity for each lightpath d within the set D of up to k-protected lightpaths is determined using a nominal sharing mechanism.

8. The method of claim 4, wherein the total backup link capacity for each lightpath d within the set D of up to k-protected lightpaths is determined using a protection release mechanism.

9. The method of claim 7, wherein the total backup link capacity for each lightpath d within a set D of up to k-protected lightpaths is determined using one of a stratification mechanism and a nonstratification mechanism.

10. The method of claim 7, wherein the total backup link capacity for each lightpath d within the set D of up to k-protected lightpaths is determined using a working reuse mechanism.

11. The method of claim 7, wherein the total backup link capacity for each lightpath d within the set D of up to k-protected lightpaths is determined using a failover ordering mechanism.

12. A method for distributing protection capacity within a mesh network, comprising:
   determining, for at least one failure associated with at least one protected lightpath in the mesh network, a corresponding failed path;
   determining a backup path capacity for the failed path;
   assigning one or more links of the failed path to other lightpaths in the mesh network; and
   storing data indicative of the backup path capacity in a network management system associated with the mesh network;
      wherein a lightpath d being processed is associated with an allowed number of failures of the lightpath d determined to affect another lightpath.

13. The method of claim 12, wherein the allowed number of failures is indicated by a corresponding count of failures where the affected lightpath is a member of a same protection tier.

14. The method of claim 13, wherein the protection tier is defined in terms of at least one of a service type, a geographic region and a service provider.

15. The method of claim 13, wherein the allowed number of failures is indicated by a corresponding count of failures where the affected lightpath is a member of a different protection tier, said protection tier being defined using at least one of a service type, a geographic region and a service provider.

16. The method of claim 1, wherein data indicative of an overall backup capacity C is adapted to manage a provisioned network experiencing one or more link failures.

17. The method of claim 1, wherein an overall backup capacity C is updated according to a component-wise maximum value C with an independent backup capacity $C_b$.

18. A computer program product wherein computer instructions, when executed by a processor in a telecom network element, adapt the operation of the telecom network element to provide a method for identifying protection capacity sharing opportunities for a mesh network topology, comprising:
   determining, for at least one failure associated with at least one protected lightpath in the mesh network, a corresponding failed path;
   determining a backup path capacity for the failed path;
   assigning one or more links of the failed path to other lightpaths in the mesh network; and
   storing data indicative of the backup path capacity in a network management system associated with the mesh network;
      wherein each of said at least one protected lightpath is associated with an allowed number of failures determined to affect another lightpath.

19. The computer program product of claim 18, wherein said telecom network element comprises a network management system (NMS).

20. A network management system (NMS) including a computer for executing instructions which adapt the operation of the computer to perform a method for distributing protection capacity within a mesh network, the method comprising:
   determining, for at least one failure associated with at least one protected lightpath in the mesh network, a corresponding failed path;
   determining a backup path capacity for the failed path;

assigning one or more links of the failed path to other lightpaths in the mesh network; and storing data indicative of the backup path capacity in a network management system associated with the mesh network;

wherein each of said at least one protected lightpath is associated with an allowed number of failures determined to affect another lightpath.

21. A method for distributing protection capacity within a mesh network, comprising:

identifying primary and protection capacity associated with each of a plurality of protected lightpaths within the mesh network;

determining, for each of a plurality of k-element failures, a corresponding protection capacity for recovering from the k-element failure;

determining protection capacity sharing opportunities according to each of a plurality of protection sharing mechanisms; and adapting protection capacity allocations in response to the determined protection sharing opportunities wherein a lightpath d being processed is associated with a counter, a value of the counter being changed if a failure of the lightpath d is determined to affect another lightpath.

22. The method of claim 21, wherein the counter is initially set to k.

23. The method of claim 22, wherein the counter is decremented only if the affected lightpath is a member of a same protection tier.

24. The method of claim 23, wherein the protection tier is defined in terms of a service type, geographic region and/or service provider.

25. The method of claim 23, wherein the counter is decremented only if the affected lightpath is a member of a different protection tier.

26. The method of claim 21, wherein the protection sharing mechanisms are selected in accordance with at least one of a management constraint and a service constraint.

27. The method of claim 21, further comprising:

determining, for a set D of up to k-protected lightpaths, a primary link capacity $C_p$; and storing data indicative of the primary link capacity $C_p$.

28. The method of claim 27, further comprising:

invoking a pre-processing heuristic to determine primary and backup path orders.

29. The method of claim 28, wherein the pre-processing heuristic operates to iteratively process each lightpath d within the set D of up to k-protected lightpaths to determine for each lightpath d a respective path p associated with a smallest maximum link capacity.

30. The method of claim 21, wherein a total backup link capacity for each lightpath d within the set D of up to k-protected lightpaths is determined using at least one of a nominal sharing mechanism, a protection release mechanism, a stratification mechanism, a nonstratification mechanism, a working reuse mechanism and a failover ordering mechanism.

31. The method of claim 21, wherein a lightpath d being processed is associated with an allowed failures counter set initially to k, the allowed failures counter being decremented if a failure of the lightpath d is determined to affect another lightpath.

32. The method of claim 21, wherein the allowed_failures counter is decremented only if the affected lightpath is a member of a same protection tier, said protection tier being defined using at least one of a service type, a geographic region and a service provider.

33. The method of claim 21, wherein the allowed failures counter is decremented only if the affected lightpath is a member of a different protection tier, said protection tier being defined using at least one of a service type, a geographic region and a service provider.

34. The method of claim 1, wherein said assigned links comprise an allocation of protection capacity, the method further comprising:

adapting protection capacity allocations associated with protected lightpaths in response to a determined overall backup capacity C of the mesh network.

35. The method of claim 34, wherein said overall backup capacity C of the mesh network is determined by processing each of a plurality of protected lightpaths within the mesh network.

* * * * *